United States Patent [19]

Sugisawa et al.

[11] Patent Number: 4,664,924
[45] Date of Patent: May 12, 1987

[54] METHOD OF PRODUCING A DEHYDRATED FOOD PRODUCT

[75] Inventors: Ko Sugisawa; Yasushi Matsumura, both of Nara; Kazumitsu Taga, Neyagawa; Ryuichi Hattori, Kyoto, all of Japan

[73] Assignee: House Food Industrial Co., Ltd., Osaka, Japan

[21] Appl. No.: 765,702

[22] Filed: Aug. 13, 1985

Related U.S. Application Data

[63] Continuation of Ser. No. 566,281, Dec. 28, 1983, abandoned.

[30] Foreign Application Priority Data

Dec. 28, 1982 [JP] Japan .............................. 57-2333397
Jan. 31, 1983 [JP] Japan ................................ 58-15107

[51] Int. Cl.⁴ ............................ A23B 7/02; H05B 6/64
[52] U.S. Cl. ........................................ 426/242; 34/92; 219/10.55 M; 426/465; 426/640

[58] Field of Search ............... 426/242, 241, 465, 640, 426/440; 34/1, 5, 92, 68; 219/10.55 R, 10.55 M, 10.55 E

[56] References Cited

U.S. PATENT DOCUMENTS 2,916,378 12/1959 Kunce et al. ......................... 426/440
3,989,858 11/1976 Williams ............................. 426/440
4,087,921 5/1978 Blok ................................ 219/10.55 R
4,418,083 11/1983 McKinney et al. .................. 426/640

Primary Examiner—George Yeung
Attorney, Agent, or Firm—Harry M. Weiss

[57] ABSTRACT

A method of producing a dehydrated food product capable of rehydration to produce reconstituted food of good quality which comprises applying microwave radiation to the food received in a container with a lid, or which comprises rotating a container in which the food is received and applying microwave radiation to the food received in the container. The dehydrated food product produced in accordance with the above methods is useful as an ingredient for use in instant food and as snack food.

12 Claims, 3 Drawing Figures

METHOD OF PRODUCING A DEHYDRATED FOOD PRODUCT

This is a continuation of application Ser. No. 566,281, filed Dec. 28, 1983, now abandoned.

BACKGROUND OF THE INVENTION

This invention relates to a method of producing a dehydrated food product utilizing microwaves. More particularly, this invention relates to a dehydrated food product which is useful as an ingredient for use in instant food and as snack food and a method of producing the same.

Recently, many dehydrated and processed food products, for example, dehydrated and processed vegetables, meat, "tamagoyaki" (fried beaten egg) and "aburage" (fried "tofu"), have been studied and developed as ingredients for use in instant (or convenient) food and the conventional methods have used a drying means such as hot-air drying, vacuum freeze-drying, drying due to high-frequency heating and microwave drying.

However, the dehydrated food product obtained by hot-air drying generally has defects that the food loses a very large part of its original volume after drying and because of this the tissue shrinks and becomes hard and thus rehydration of the dehydrated food product is bad. On the other hand, the dehydrated food product obtained by vacuum freeze-drying is satisfactory to some degree as regards rehydration but there are problems that the drying time is long and the drying process is very expensive to carry out.

Microwave drying does not cause the problems encountered in the above drying methods but there is a defect that it sometimes induces uneven heating in the food to be treated. Thus, in some case, it is difficult to uniformly dehydrate the food to be treated and the obtained dehydrated food product cannot uniformly be rehydrated.

In order to obviate the above defects, for example, regarding the rehydration of dehydrated food product, (e.g., dehydrated "aburage"), the following drying methods are known: "aburage" after being immersed in a seasoning liquor or without immersing therein is pressed with a roller and thereafter is dehydrated by the freeze-drying, hot-air drying or drying due to high-frequency heating. However, these known methods can not completely obviate the above defects. The obtained dehydrated "aburage" product has an uneven shape and a bad appearance, and thus is not suitable for continuous and automatic packing and packaging.

U.S. Pat. No. 3,973,047 discloses a process of dehydrating vegetables by a hot-air drying technique. In this patent, vegetable or vegetable pieces are dehydrated with hot air to a moisture content less than about 30% and are thereafter contacted with air having a dry bulb temperature from about 140° F. to about 200° F. and a wet bulb temperature from about 120° F. to about 180° F. for a time period of less than 12 minutes, and are then further dehydrated with hot air to a moisture content of less than about 8%. The dehydrated food obtained by the above hot air drying technique has the defects as mentioned above.

U.S. Pat. No. 3,984,577 discloses a method of producing a compacted, freeze-vacuum-dehydrated food, e.g., vegetables and meats. This method comprises compacting said food while frozen in particulate form and simultaneously freeze-vacuum-dehydrating said food to a moisture content below about 4.0% by weight, said compacting being carried out by applying mechanical pressures of at least about 20 psi and sufficient to provide a freeze-vacuum-dehydrated food having a bulk density of from about 0.5 to about 1.2 g/cc. In the dehydrating method of the U.S. patent, however, the dehydrating time is long and the dehydrating process is very expensive to carry out.

Japanese Pat. No. 1,087,793 relates to a method of seasoning and dehydrating "aburage". This patent claims a method of seasoning and dehydrating "aburage" which comprises pouring a seasoning liquor at 80° C. or more into the "aburage" under a hot-air atmosphere at about 100° C. or more and simultaneously applying a pulsating microwave radiation. The microwave drying in this patent has defects as mentioned above.

Moreover, in the case where the food to be treated contains a large quantity of a seasoning liquor, (e.g., the seasoned "aburage") and is to be dehydrated by the above drying methods, there are defects that the seasoned food is dehydrated in such state that the seasoning materials are condensed locally in the food to be treated and that the seasoning liquor flows out as a drip from the seasoned food during the drying operation.

SUMMARY OF THE INVENTION

This invention obviates the above defects of the conventional methods. The object of this invention is to provide a method of producing a uniformly dehydrated food product having an excellent rehydration property and furthermore to provide a method of producing a snack food having good taste and texture. The obtained product has a good appearance and can be automatically and continuously packed and packaged.

The gist of this invention which attains the above objects and other objects resides in a method of producing a dehydrated food product which comprises receiving the food to be treated in a container having microwave permeability and gas permeability, covering the container with a lid and thereafter dehydrating the food by the application of microwave radiation, and, optionally, fixing the amount of space between the top surface of the received food and the lid; and a method of producing a dehydrated food product which comprises receiving the food to be treated in a container having microwave permeability and gas permeability and thereafter uniformly applying microwave radiation to the food while rotating the container, to uniformly dehydrate the food.

DESCRIPTION OF THE INVENTION INCLUDING THE PREFERRED EMBODIMENTS

Figure 1:
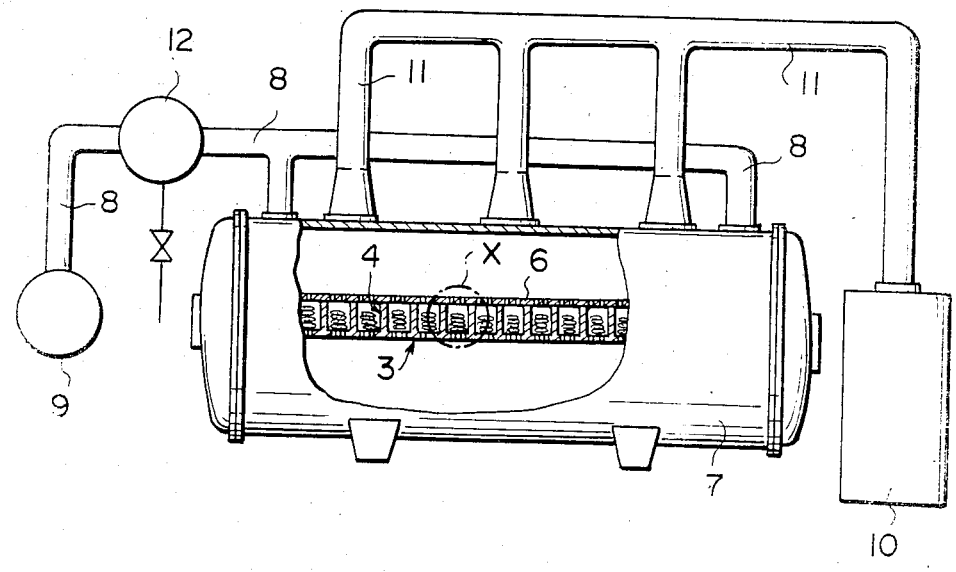
FIG. 1 shows an embodiment of an apparatus for carrying out the method of this invention in which a drying chamber is shown in a cutaway view.

This invention relates to dehydration of food with microwave radiation. The typical foods to which this invention can be applied are those of vegetables, meat, "tamagoyaki", "aburage", fruit, etc. and dough from wheat flour or the like, as well as the above-mentioned foods after impregnation with seasoning liquor and coating with seasoning liquor. The foods to be treated according to this method include all the foods of which dehydration is required to impart convenient properties or to obtain snack foods.

The above "tamagoyaki" is made by mixing beaten egg with a seasoning liquor and frying the mixture to form a sort of omelet.

"Aburage" is a sort of fried bean curd and is yellow in color, hard-surfaced and contains more oil than fresh "tofu" on a dry basis.

The above "aburage" is deep fat fried "tofu" and the chief type thereof is made from thin-sliced "tofu" by two stages of frying. Generally, "aburage" is made as follows.

Soybean is immersed into water and sufficiently soaked with water and thereafter ground while adding water in an amount equal to about ten times the quantity of the soybean to obtain "Go" (mashed soybean). "Tofu" refuse is removed from the "Go" to obtain soybean milk. Then, a coagulating agent such as calcium sulfate or the like is added to the resulting soybean milk to obtain "tofu". Thereafter, the "tofu" is cut into a thin form and is pressed to extract the excessive water. The pressed "tofu" is subjected to a first deep frying treatment at a temperature of about 120° C. Then, the first fried "tofu" is subjected to a second deep frying treatment at a temperature high enough to cause expansion of the above thin-sliced "tofu" (about 190° C.), and thus "aburage" is obtained. Alternatively, there is a method for producing "aburage" which comprises forming a dough by adding water and gums to vegetable protein and molding the dough into the form of a thin layer and thereafter subjecting it to a deep frying treatment.

In dehydrating the above food to be treated, the food is received in a container after being immersed in a seasoning liquor or without immersing therein and thereafter is dehydrated with microwave radiation. The above container should be microwave-permeable and gas-permeable. The object of this invention can be attained by using a container having the above two properties.

As a container having the above two properties, there can be mentioned a container made from a microwave-permeable material and having at least one small hole of a size enough to allow passage of gas. As typical examples of microwave-permeable material, there can be mentioned, for example, synthetic resin such as fluorocarbon resin (e.g., Teflon), silicone resin, polypropylene, polyethylene or the like, ceramics, glass fiber, talc porcelain, quartz, aluminous porcelain and the like.

According to one aspect of this invention, the food to be treated is charged in the above container and the lid is put thereon, and then the microwave radiation is applied to dehydrate the food. During the application of the microwave radiation, the food is expanded due to evaporation of water contained therein. Thus, in the case where it is necessary to control the expansion in order to obtain a dehydrated food product of good quality, the amount of space between the lid and the top surface of the food to be treated should be fixed at a specific magnitude, whereby the expansion of the food in the direction of the height of the container is appropriately controlled.

In this respect, the following illustration is made regarding dehydration of "aburage". During the microwave drying operation, the "aburage" is expanded due to evaporation of water contained therein. If the "aburage" is expanded under a free condition, the expansion becomes ununiform due to ununiform and free evaporation of water contained in the "aburage". In order to prevent such phenomenon, it is useful to control the direction of the expansion of "aburage" as mentioned above.

In this invention, the expansion of the food to be treated, e.g., "aburage", in the direction of thickness thereof can be controlled by fixing the amount of space between the top surface of the uppermost piece of "aburage" which is received in the container and the lid at an appropriate level. The size of the space which is required varies depending on the thickness of the "aburage" to be treated, the number of pieces thereof and the like. Generally, the space of a magnitude which satisfies the following equation is preferable $$0.4 x \cdot y \leq z \leq 1.0 x \cdot y$$

wherein z represents the distance (mm) between the lid and the top surface of the uppermost piece of "aburage" to be treated, x represents thickness (mm) of each piece of "aburage" and y represents the number of pieces of "aburage".

The microwave drying operation may be carried out either under normal pressure or reduced pressure. In order to efficiently attain the object of this invention, the microwave drying operation is preferably carried out under the condition such that the expansion of the "aburage" is promoted to some degree, i.e., under reduced pressure. Those skilled in the art can appropriately select microwave output and the degree of vacuum to be used in this invention in view of the amount, size and the like of the "aburage" to be treated. Generally, the degree of vacuum is about 1,000 Pa to about 20,000 Pa, preferably about 1,330 Pa to about 13,300 Pa and more preferably about 2,660 Pa to about 6,650 Pa. Pa is a symbol for "Pascal" which is a unit for measuring pressure under the metric system. 1 kilopascal equals 0.1450377 lb/in$^2$.

According to this invention, the higher the expansion ratio of the "aburage" during the drying operation, the more the expansion thereof in the direction other than that of thickness, i.e., in the sideways direction (i.e., the lengthwise and widthwise directions). Thus, the size of the "aburage" becomes large and simultaneously the structure thereof becomes porous, and furthermore the drying efficiency and rehydration of the dehydrated piece of "aburage" are improved. In addition, the "aburage" is pressed by the reaction to the force of the expansion in the thickness direction since the amount of possible expansion is limited. As a result, the shape of the dehydrated piece of "aburage" becomes uniform and the surface becomes flat. The pressing action as mentioned above induces uniform evaporation of water from the "aburage" and as a result attains the effect of making the "aburage" uniformly dehydrated.

It is noted that microwave output and the degree of vacuum vary depending on the kind, size, amount and the like of the food to be treated and can appropriately be selected by those skilled in the art according to the object of this invention.

Figure 2:
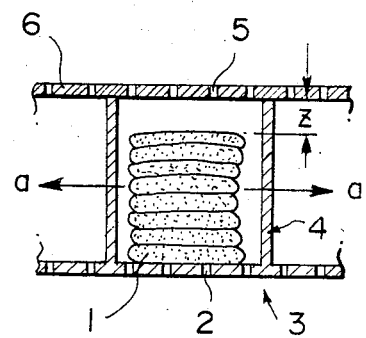
FIG. 2 shows an enlarged view of "X" in FIG. 1.

A preferred embodiment of the method of this invention which is carried out using a reduced pressure microwave drying apparatus, given by way of non-limitative example only, is now described with reference to the accompanying drawings, FIGS. 1 and 2.

Several pieces of "aburage" 1 produced according to the conventional method are received in each of several cells 4 in a Teflon container 3 having a plurality of small holes 2, after being impregnated with a seasoning liquor or without being impregnated therewith. Then, a Teflon lid 6 having a plurality of small holes 5 is put on the container. In this case, it is preferable that the distance z between the lid 6 and the top surface of the uppermost piece of "aburage" to be treated satisfies the equation: $0.4x \cdot y \leq z \leq 1.0x \cdot y$ as mentioned above.

Then, said container 3 is set up in a reduced pressure microwave drying apparatus 7 and thereafter the pressure in the apparatus 7 is adjusted to a desired degree of vacuum by means of a vacuum pump 9 connected to said apparatus 7 through an exhaust pipe. Then, microwaves from a microwave oscillator 10 are applied to the pieces of "aburage" through a waveguide 11. The energy of the applied microwaves is used to rapidly evaporate water contained in the "aburage" in the container 3 and thus the pieces of "aburage" are rapidly expanded due to the evaporation. Namely, the pieces of "aburage" are expanded mainly in directions other than that of thickness, i.e., in the direction of the arrows "a" as shown in FIG. 2 and the direction normal to the plane of the drawing. The water vapor evaporated from the "aburage" is extracted from the apparatus 7 through the exhaust pipe 8, condensed in a cold trap 12 and exhausted from the system. After the drying operation has been completed, the dehydrated pieces of "aburage" are withdrawn from the apparatus 7.

The method of dehydrating "aburage" as mentioned above is applicable to other foods in the same way or in an improved way.

According to another aspect of this invention, in the case where the food to be treated which was received in the container having the two properties as mentioned above is dehydrated in the microwave drying apparatus, it is desired to rotate the container in the drying apparatus to thus uniformly dehydrate the food therein.

Rotation of the container herein is, for example, such that the container or container frame held by a horizontal shaft in the drying apparatus is rotated together with rotary motion of the horizontal shaft. Although the container or container frame may be supported and rotated by other methods, in any case the motion of the container or container frame must be such that the microwave radiation is uniformly applied to the food to be treated and thus the food is uniformly dehydrated. The above method is useful to prevent the uneven dehydrating caused when the microwave radiation is applied to food left at rest.

Moreover, in the drying method wherein the container or container frame is supported by a vertical shaft and is rotated according to the motion of the shaft but in a horizontal plane, even if the microwave radiation can uniformly be applied to the food, water and the seasoning liquor which are contained in the food migrate into and are concentrated at the lower portion thereof and thus it is difficult to obtain a uniformly dehydrated food product. This phenomenon can occur also in dehydrating food left at rest.

By carrying out the microwave drying operation while rotating the container together with rotary motion of the horizontal shaft as mentioned above, the food to be treated and the energy of the microwaves can efficiently be brought into uniform contact and it becomes possible to prevent water and the seasoning liquor in the food from concentrating in one direction. As a result, it becomes possible to dehydrate the food while uniformly maintaining the concentration of water and seasoning liquor in each portion of the food to be treated. In order to efficiently attain the above effect, it is preferable to apply the microwave radiation to the food from the upper portion of the drying apparatus.

Moreover, in dehydrating a food which contains large quantities of components which can easily be degraded by heating, where it is desired to obtain a dehydrated food product which has good rehydration property by hot water, it is preferable to use the reduced pressure microwave drying method. By using the reduced pressure microwave drying operation, the food to be treated can be dehydrated at a relatively low temperature and also there is obtained a dehydrated food product having a porous state and good water absorption properties.

In the case where fruit or the like which was impregnated with a seasoning liquor is subjected to the reduced pressure microwave drying treatment to obtain snack food, the fruit can be dehydrated such that the flavor-bearing materials in the seasoning liquor are uniformly distributed and it is possible to obtain a snack food which sufficiently retains the flavor of the fresh fruit or the like to be treated and has a tender and very light taste and texture.

The microwave output, the rotation rate of the container or container frame and the degree of vacuum can appropriately be selected by those skilled in the art in view of the kind, amount, size and the like of the food to be treated. The rotation of the container may be started up at the same time as, or before or after the application of the microwave radiation. This can appropriately be accomplished by those skilled in the art in view of the kind and the like of the food to be treated.

A preferred embodiment of the method of this invention in which the reduced pressure microwave drying apparatus is used, given by way of a non-limitative example only, is now described with reference to FIG. 3.

Material A to be treated is received in a Teflon container 22 having a plurality of small holes 21 and then a Teflon lid 24 having a plurality of small holes 23 is shut onto the container. Thereafter, the container 22 is fitted into a frame 26 for supporting the container which is provided in a reduced pressure microwave drying apparatus 25. The container supporting frame 26 is equipped with horizontal shafts 27 and 28 and a pulley 29 is fitted with the horizontal shaft 27. The pulley 29 is connected to a motor 32 through a V belt 30 and a pulley 31. The other horizontal shaft 28 is supported by a supporting means 34 equipped with a supporting means 33 on the drying apparatus 25. The container 22 is set on the supporting frame 26, a lid 35 of the apparatus 25 is clamped thereon and then a vacuum pump 37 connected to the apparatus 25 through an exhaust pipe 36 is started up and the pressure in the apparatus 25 is adjusted to the desired degree of vacuum. Thereafter, microwaves from a microwave oscillator 38 are applied to the food through a waveguide 39. At the same time as, or before or after the microwave oscillator 38 is started up, the motor 32 is started up to rotate the horizontal shafts 27 and 28. Thus, the container supporting frame 26 and the container 22 which are integrated with the horizontal shafts 27 and 28 rotate on its own axis and thus the microwave radiation is uniformly applied to the food in the container to obtain a desired dehydrated food product.

Figure 3:
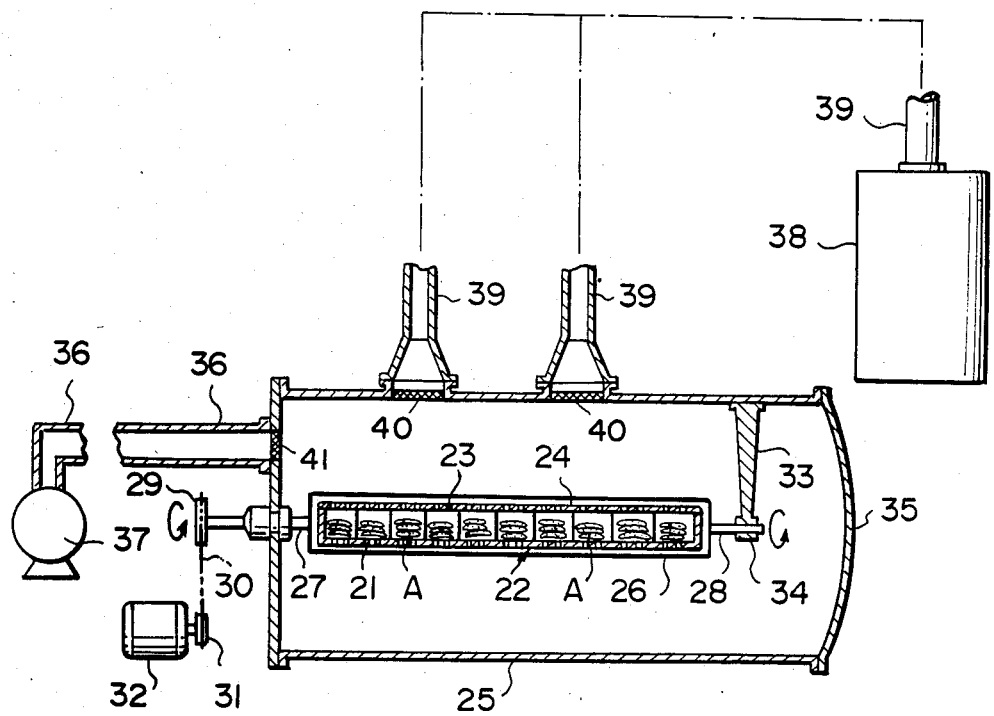
FIG. 3 shows an embodiment of a reduced pressure microwave drying apparatus which is used to carry out the method of this invention.

In FIG. 3, reference numeral 40 represents a portion composed of a microwave-permeable and gas-permeable material such as quartz, ceramics, polystyrene, aluminous porcelain, calcium fluoride, fluorine-containing polymers or the like. Reference numeral 41 represents a portion (e.g., a panting plate or wire gauge) composed of a gas-permeable and microwave-impermeable material such as aluminium, stainless steel, steel, light alloy or the like.

Below are described comparative tests demonstrating the effect of the method of this invention, and examples of the invention. These are presented for explanatory purposes and are not to be considered as limiting the invention in any way.

COMPARATIVE TEST (1) This Invention 10 pieces of commercially available "aburage" (75 mm×70 mm×7 mm) were immersed in a seasoning liquor to obtain seasoned "abruage" pieces. The 10 pieces of "aburage" weighed 92 g before being seasoned and weighed about 260 g after having being seasoned.

Then, the 10 seasoned pieces of "aburage" were stacked and pressed and squeezed by means of a flat board till the pressed pieces of "aburage" weighed 148 g.

The so-obtained stack of "aburage" pieces was received in a Teflon container having a plurality of small holes and a Teflon lid having a plurality of small holes was clamped thereon. The seasoned and pressed pieces of "aburage" had an average thickness of 2.7 mm per piece and the distance between the lid and the top surface of the uppermost piece was 13 mm.

Thereafter, the seasoned pieces of "aburage" were subjected to the microwave drying treatment under the conditions of a pressure of 2660 Pa and a microwave output of 1 KW for 14 minutes. There were obtained dehydrated pieces of "aburage" having a water content of about 12%.

(2) Comparative Example 1

The procedure as in the above (1) was repeated except that the open container (without clamping the lid thereon) was used to apply the microwave radiation under reduced pressure.

(3) Comparative Example 2

Seasoned pieces of "aburage" which were pressed and squeezed by the same procedure as in the above (1) were placed in a tray without placing one over another, and were subjected to a vacuum freeze drying treatment under the conditions of a pressure of 26.6 Pa and a radiant shelf temperature of 80° C. for 4 hours. Then, the dehydrated pieces of "aburage" were left to stand for one hour in a thermohygrostate of 20° C. and relative humidity of 90%, and further were left to stand under ambient atmosphere for an additional 5 hours to obtain dehydrated pieces of "aburage" having a water content of about 12%.

(4) Comparative Example 3

Seasoned pieces of "aburage" which were pressed and squeezed by the same procedure as in the above (1) were placed in a tray without placing one over another, and were subjected to a hot air drying treatment under conditions of 60° C., relative humidity of 40% and air velocity of 1.5 m per second for 6 hours. Then, the dehydrated pieces of "aburage" were laid open to the ambient atmosphere and left to stand at room temperature for 6 hours to obtain dehydrated pieces of "aburage" having a water content of about 12%.

Regarding the above-mentioned dehydrated pieces of "aburage", there were carried out comparative tests as regards the size and shape of the dehydrated "aburage" and rehydration property by hot water. Table 1 shows the results of the comparative tests.

TABLE 1

| Sample | Size (mm) | Rehydration Time (min.) | Brief Comments on Shape |
|---|---|---|---|
| This Invention | 87 × 84 × 4–6 | 0.5 | Dried uniformly; Flat surface and regular shape. |
| Comparative Example 1 | 85 × 82 × 8–12 | 1.0 | Dried more unevenly; Irregular shape due to expansion in the direction of thickness. |
| Comparative Example 2 | 81 × 78 × 4–6 | 0.5 | Uniformly dried state attributable to the moisture absorption treatment carried out after drying; Rather regular shape. |
| Comparative Example 3 | 73 × 68 × 3–4 | not less than 3 | Dried with pronounced unevenness; Wrinkled surface; Shape showed remarkable shrinkage due to heating. |

From the above Table 1, the following observations can be made.

According to this invention, the size of the dehydrated "aburage" pieces can be enlarged as compared with that of the pieces before treatment, whereby there can be obtained the dehydrated "aburage" having good appearance. Also, the rehydration time of the dehydrated "aburage" can be shortened since the texture thereof becomes porous. Moreover, the obtained "aburage" was uniformly dehydrated at each portion thereof, and had a flat surface and regular shape.

Thus, the "aburage" according to this invention can be rehydrated in such a state that each portion thereof is uniformly rehydrated so that the "aburage" has uniform taste and texture. In addition, it becomes possible to continuously and automatically pack and package the dehydrated "aburage".

The dehydrated "aburage" having the above advantages can be obtained merely by controlling the expansion of the "aburage" being treated in the direction of the thickness during the drying operation by the application of microwave radiation. This controlling technique obviates all the defects that arise in the case where the vacuum freeze-drying and the hot-air drying are carried out, these defects being that an additional conditioning step for moisture absorption into the dehydrated "aburage" is needed, that is difficult to dry the stack of "aburage" pieces and that a long drying time is needed.

EXAMPLE 1

A stack of 10 pieces of commercially available "aburage" (75 mm×70 mm×7 mm per piece) was received in a Teflon container having a plurality of small holes and a Teflon lid having a plurality of small holes was clamped thereon. The "aburage" had a thickess of 7 mm per piece and the distance between the lid and the top surface of the uppermost "aburage" piece was 30 mm.

Then, the "aburage" pieces were subjected to the microwave drying treatment under the conditions of a pressure of 2660 Pa and microwave output of 1 KW for 10 minutes. The obtained dehydrated pieces of "aburage" were enlarged to approximately 84 mm×81 mm×10 mm per piece and had very good appearance; the rehydration time by hot water was 40 seconds.

EXAMPLE 2

10 pieces of commercially available "aburage" (75 mm×70 mm×7 mm per piece) were immersed in a seasoning liquor to obtain seasoned pieces of "aburage". Then, the stack of the 10 seasoned "aburage" pieces was pressed and squeezed by means of a flat board.

The so-obtained stack of 10 pieces of "aburage" was received in a Teflon container having a plurality of small holes and a Teflon lid having a plurality of small holes was clamped thereon. The pressed "aburage" had an average thickness of 2.7 mm per piece and the distance between the lid and the top surface of the uppermost "aburage" piece was 11 mm.

Thereafter, the seasoned pieces of "aburage" in the container were dehydrated under normal pressure and a microwave output of 1 KW for 14 minutes. The obtained dehydrated "aburage" was enlarged to the size of approximately 85 mm×82 mm×4 to 8 mm per piece and had very good appearance; the rehydration time by hot water was 50 seconds.

EXAMPLE 3

1000 pieces of "aburage" (about 70 mm×70 mm×8 mm and about 9 g per piece) were immersed in a seasoning liquor under boiling for about 30 minutes to obtain seasoned "aburage" pieces. Then, the seasoned pieces of "aburage" were cooled to about 40° C. Stacks of 20 seasoned pieces of "aburage" were pressed and the excessive liquor was removed till the "aburage" pieces of each stack weighed 330 g.

Then, the stacks of 20 pieces of "aburage" were received in the cells of a Teflon container having a plurality of small holes and a Teflon lid having a plurality of small holes was applied. Thereafter, the "aburage" pieces were subjected to the reduced pressure microwave drying treatment under the conditions of a pressure of 1,330 Pa, a microwave output of 50 KW and rotary speed of the container of 6 r.p.m. The obtained dehydrated "aburage" weighed about 9.5 g per piece and had the size of about 80 mm×80 mm×6 mm per piece. The degree of the expansion of the obtained "aburage", the degree of the dehydration thereof and the degree of distribution of the seasoning liquor therein were uniform and were obviously superior to those of the "aburage" which was obtained by repeating the above procedure but without rotating the container (i.e. with the container left at rest).

In addition, according to this invention, none of the seasoning liquor impregnated into the "aburage" flowed out as a drip during the drying operation, and on the other hand, in the case where the drying operation was carried out under the same conditions as this invention but without rotating the container, the seasoning liquor in the "aburage" considerably flowed out as a drip during the drying operation.

The rehydration property of the dehydrated "aburage" by hot water will now be described.

The dehydrated "aburage" obtained according to this invention was completely rehydrated by immersing it in hot water (about 90° C.) for only 30 seconds, while the "aburage" which was dried without rotating the container required a rehydration time of 90 seconds in hot water (about 90° C.). In addition, the taste of the latter rehydrated seasoned "aburage" was inferior to that of the former because of the larger amount of the seasoning liquor which flowed out as a drip during the drying operation.

Moreover, regarding the "aburage" which was dehydrated without rotating the container, the portion in which the seasoning materials were locally concentrated caused a burned smell by overheating during the drying operation and in extreme cases, the dehydrated pieces of "aburage" stuck to one another.

EXAMPLE 4

A stack of 10 seasoned "aburage" pieces, which was obtained by the same procedure as in Example 3, was pressed and the excessive liquor was removed till the "aburage" pieces weighed 148 g.

Then, the stack of 10 pieces of "aburage" was received in a Teflon container having a plurality of small holes and a Teflon lid having a plurality of small holes was clamped thereon. Thereafter, the "aburage" pieces were subjected to the reduced pressure microwave drying treatment under the conditions of a pressure of 13,300 Pa, microwave output of 10 KW and a container rotating speed of 3 r.p.m. The obtained dehydrated "aburage" pieces weighed about 9.5 g per piece and had a size of about 77 mm×77 mm×6 mm per piece, and further had excellent features like the "aburage" in Example 3.

EXAMPLE 5

Fresh apples were pared, cored and then cut into fan shape pieces having a thickness of 4 mm, a short arc of 10 mm, a long arc of 25 mm and a width of 20 mm to obtain 10 Kg of the apple pieces. Then, 10 Kg of the apple pieces were immersed in 40 Kg of a syrup solution comprising a 8 Kg of saccharose, 0.12 Kg of L-ascorbic acid and 31.88 Kg of water. The immersion was carried out under a pressure of 2660 Pa for 10 minutes to obtain about 14 Kg of the impregnated apple pieces.

The impregnated apple pieces were charged in a Teflon container having a plurality of small holes and a Teflon lid having a plurality of small holes was clamped thereon. Then, microwave radiation was applied to the apple pieces with the container left at rest under the conditions of a pressure of 2660 Pa and a microwave output of 10 KW for one minute to slightly dry the surface of the apple pieces, and thereafter the predried apple pieces were subjected to the reduced pressure microwave drying treatment under the conditions of a pressure of 2660 Pa, a microwave output of 20 KW and a container rotating speed of 4 r.p.m. The degree of dehydration of the obtained apple pieces, the porosity thereof and the degree of distribution of the seasoning liquor therein were uniform. The obtained apples had a very tender and light taste and texture and had the flavor of a fresh apple, and were useful as snack food.

EXAMPLE 6

Fresh green asparagus was washed in water and cut into about 5 cm pieces to obtain 8 kg of the green asparagus pieces. The cut asparagus was parboiled in 0.5% of a solution of salt (70° C.) for 2 minutes and then was immersed in a solution comprising 10% by weight of salt and 10% by weight of sorbitol under a pressure of 7980 Pa for about 5 minutes to obtain about 10 Kg of asparagus pieces.

About 10 Kg of the obtained asparagus pieces were charged in a Teflon container having a plurality of small holes and a Teflon lid having a plurality of small holes was clamped thereon. Then, microwave radiation was applied to the asparagus pieces under normal pressure and a microwave output of 50 KW for 20 minutes. At one minute after the application of the microwave radiation, the rotation of the container was started up at a rotary speed of 6 r.p.m. After the application of the microwave radiation was completed, the drying apparatus was ventilated for 3 minutes while rotating the container.

The degree of dehydration of the obtained dehydrated asparagus pieces, the porosity thereof and the degree of distribution of the seasoning liquor therein were uniform and rehydration property by hot water was good.

The principles, preferred embodiments and modes of operation of the present invention have been described herein. The invention which is intended to be protected herein, however, is not to be construed as limited to the particular forms disclosed since these are to be considered as illustrative rather than restrictive. Variations and changes may be made by those skilled in the art without departing from the spirit of the invention.

We claim:

1. A method for producing a dehydrated porous seasoned food product useful as an ingredient of instant food and as snack food, comprising the steps of:

placing seasoned food to be dried in an elongated container having partition walls for dividing the interior area into a plurality of compartments and having a microwave-permeable and gas-permeable bottom wall;

covering said elongated container with a lid having microwave-permeable and gas-permeable properties; and thereafter applying microwave radiation to said seasoned food contained in said compartments under reduced pressure while rotating said container held by a horizontal shaft with the rotary motion of said horizontal shaft to uniformly dehydrate the seasoned food.

2. The method as set forth in claim 1, wherein said container is composed of a material selected from the group consisting of a synthetic resin material, talc porcelain material, quartz material and aluminous porcelain material.

3. The method as set forth in claim 2, wherein said container has at least one small hole having a size large enough to allow passage of gas.

4. The method as set forth in claim 2, wherein said synthetic resin material is selected from the group consisting of fluorocarbon resin material, silicone resin material, polypropylene material and polyethylene material.

5. The method as set forth in claim 3, wherein said synthetic resin material is selected from the group consisting of a fluorocarbon resin material, silicone resin material, polypropylene material and polyethylene material.

6. The method as set forth in claim 5, wherein said seasoned food to be treated is selected from the group consisting of vegetable, meat, tamagoyaki, aburage, fruit and wheat dough.

7. The method as set forth in claim 6, wherein said seasoned food to be treated is aburage, said aburage being received in said container with a space between the uppermost piece of said aburage and said lid being controlled, wherein the expansion thereof in the direction of thickness during said drying operation is controlled.

8. A method as set forth in claim 7, wherein said controlled space is defined by the following equation:

$$0.4x \cdot y \leq z \leq 1.0x \cdot y$$

wherein z represents a distance (mm) between said lid and the top surface of the uppermost piece of said aburage to be treated, x represents a thickness (mm) of each piece of said aburage and y represents a number of pieces of said aburage.

9. A method as set forth in claim 8, wherein said pressure is about 1,330 Pa to about 13,300 Pa.

10. A method as set forth in claim 9, wherein said rotation of said container is started up at the same time as the application of microwave radiation.

11. A method as set forth in claim 9, wherein said rotation of said continer is started up before the application of said microwave radiation.

12. A method as set forth in claim 9, wherein said rotation of said container is started up after the application of said microwave radiation.

* * * * *